Nov. 22, 1927.
W. E. KELLY ET AL
1,650,451
LUGGAGE CARRIER
Filed April 12, 1922   2 Sheets-Sheet 2
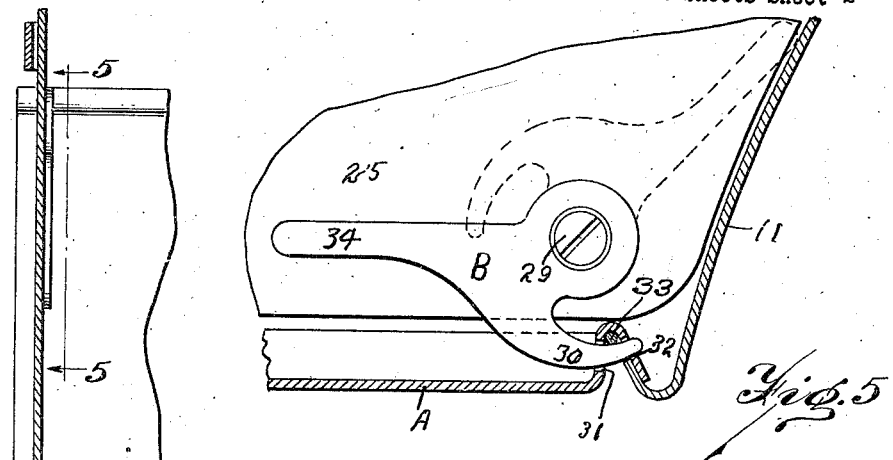
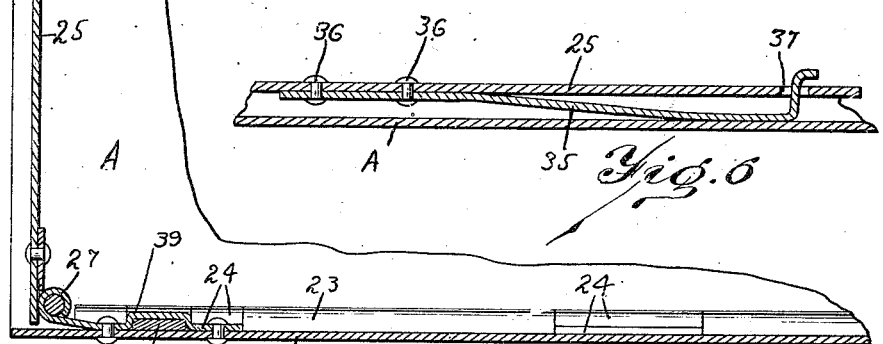
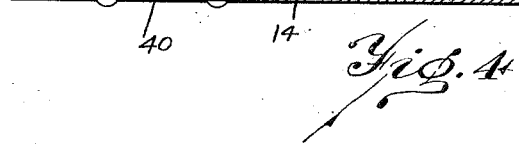
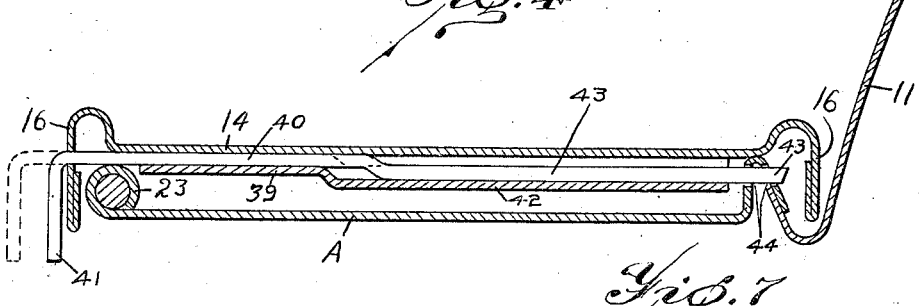
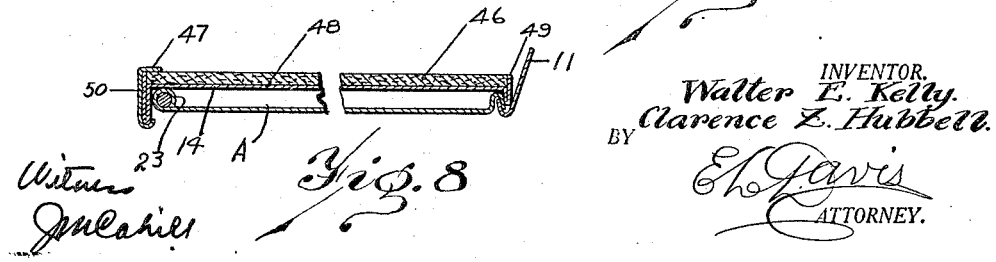
INVENTOR.
Walter E. Kelly.
Clarence Z. Hubbell.
BY
ATTORNEY.

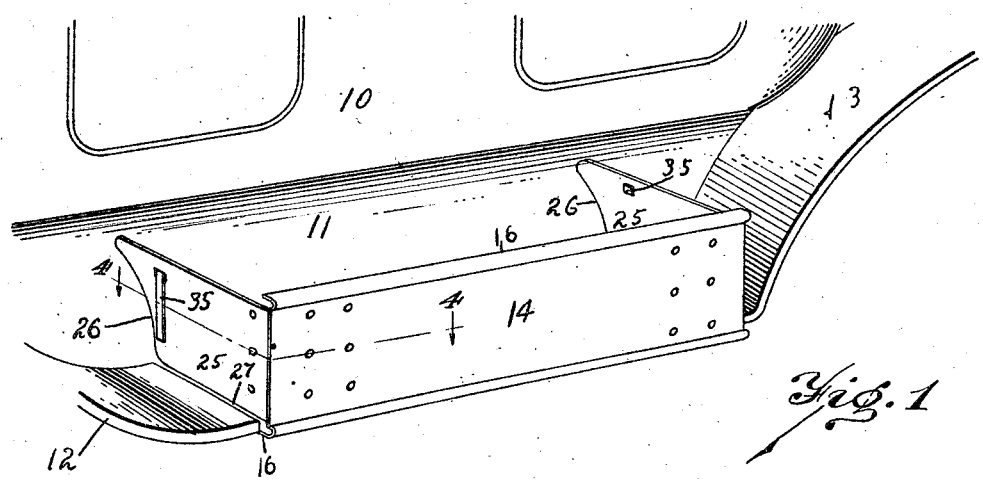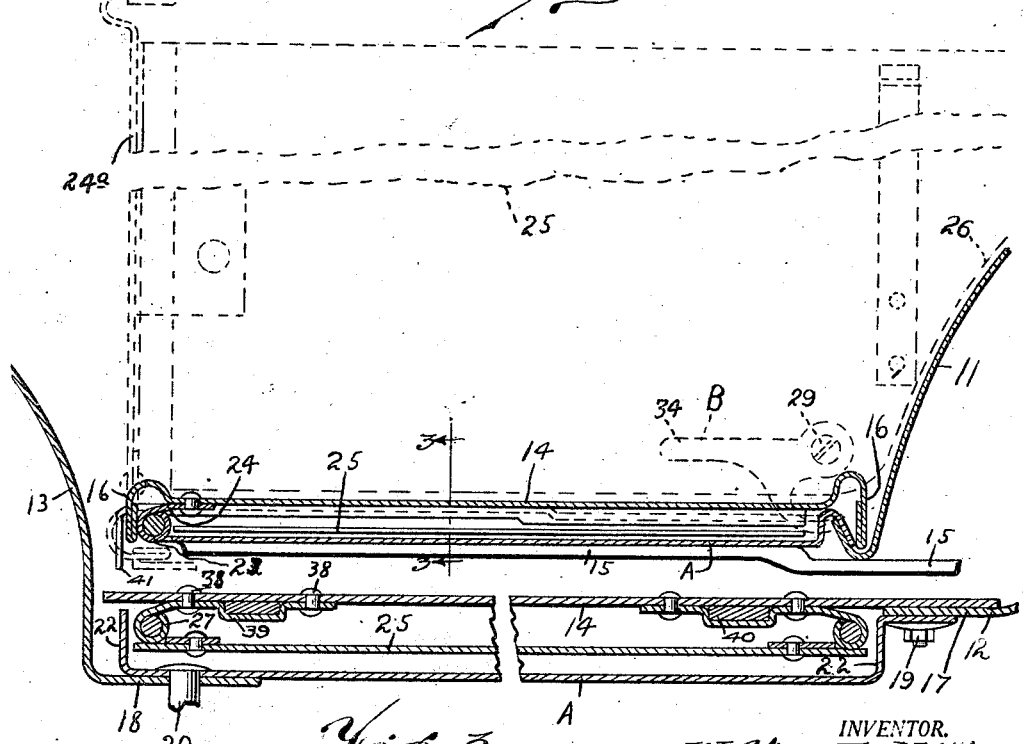

Patented Nov. 22, 1927.

1,650,451

UNITED STATES PATENT OFFICE.

WALTER E. KELLY, OF HIGHLAND PARK, AND CLARENCE Z. HUBBELL, OF ROYAL OAK, MICHIGAN.

LUGGAGE CARRIER.

Application filed April 12, 1922. Serial No. 552,057.

The object of our invention is to provide new and useful improvements in a luggage carrier, of simple, durable, and inexpensive construction.

A further object of our invention is to provide a luggage carrier adapted to be used in place of the running board ordinarily provided with an automobile, or to be built into an automobile in the place of the ordinary running board.

A further object of our invention is to make such a luggage carrier which will be strong, durable, noiseless, compact, roomy, and which will be substantially unsightable when not in use and which will not interfere with the use of the running board as a step when the device is not being used as a luggage carrier.

A further object of our invention is to provide a luggage carrier associated with and combined with the running board of an automobile in such a way that the normal appearance of the automobile will not be appreciably altered nor its utility affected when the luggage carrier is not in use.

A further object of our invention is to provide a luggage carrier for the running boards of automobiles which is adapted for carrying successfully a large variety of articles which it might be convenient to carry in such a way whether such articles may be bulky, granular or heavy.

A further object of our invention is to provide a luggage carrier for automobile running boards with anti-rattling devices, to provide means for holding same in locked and unlocked positions, and to provide means for protecting the device from the disadvantages of its position on the automobile.

With these and other objects in view, our invention consists in the arrangement, combination, and construction of the various parts of our improved device, as described in the specification, claimed in our claims, and shown in the accompanying drawings, in which:

Figure 1 shows a perspective view of our improved device installed on an automobile running board.

Figure 2 shows a vertical, transverse, sectional view thru our improved device, parts being shown in dotted lines to illustrate certain of their positions.

Figure 3 shows a longitudinal, vertical, sectional view taken on the line 3—3 of Figure 2.

Figure 4 shows a horizontal, sectional view taken on the line 4—4 of Figure 1.

Figure 5 shows an enlarged detail sectional view illustrating the locking device used in connection with our improved construction.

Figure 6 illustrates an enlarged detail sectional view illustrating one of the anti-rattling devices used in connection with our improved device.

Figure 7 illustrates a transverse, vertical, sectional view showing the locking and anti-rattling devices associated with our construction, and Figure 8 shows a vertical, transverse, sectional view of an alternating form of our improved device.

Referring to the accompanying drawings, we have used the reference numeral 10 to indicate, generally, the body of an automobile having a mud-apron 11 extending down from the body to the running board between the front fender 12 and the rear fender 13. It will be understood that the running board of the ordinary automobile extends between the rear edge of the front fender 12 and the front edge of the rear fender 13. These running boards are of various forms and constructions, some of them being made from parts covered with linoleum and supported on brackets extending from the frame of the automobile, while others are formed from pieces of sheet metal having their side edges turned down to form a brace for the running boards and at the same time to give the running boards the appearance of thickness and strength. For instance, in one well known make of automobile the running board so used has a cross-section such as is illustrated at 14 in Figure 2. This type of running board is supported by lifting it to brackets extending from the frame of the automobile and providing spacing blocks between the running board proper and such brackets. On the other hand, where wooden boards are used instead of metal boards for the running boards of automobiles, then the spacing blocks mentioned are ordinarily dispensed with.

From the foregoing it will be seen that there is normally an available thickness in connection with the running boards of automobiles approximating the thickness of an average board either due to a spacing plug being used with the metal running board, or to the use of a wooden board for the running board.

It is the object of our invention to provide a luggage carrier for running boards for automobiles which may be folded down when not in use, so that it will occupy substantially only the space normally occupied by the running board of an automobile, and also so that it may be given an appearance very similar to, or exactly like, the running board provided with an automobile.

In accomplishing this object a number of problems have been solved and the structures hereinafter described and claimed each have their peculiar and inter-related functions for attaining the desired results.

In the form of the invention illustrated in the drawings, except in Figure 8, we have shown a method of attaching our invention to an automobile of the type having a metal running board with spacing plugs thereunder designed to space it from the supporting brackets 15 to position it properly relative to the ends of the fenders 12 and 13. In the type of automobile here illustrated the mud guard 11 has an upturned edge at its lower border normally designed to overlap the downwardly turned edge 16 of the running board ordinarily provided with an automobile. The rear edge of the front fender 12 has a horizontally disposed portion 17 which is normally designed to be riveted to the running board 14 thru a spacing plug which is not here illustrated, while the rear fender 13 has a horizontal portion 18 which is designed to be fastened by rivets or the like directly to the running board 14.

In connection with our invention the running board 14 normally provided with an automobile is first removed and then a pan designated generally by the reference letter "A" is secured by bolts 19 to the horizontal flange 17 of the front fender by rivets or bolts 20 to the horizontal front edge of the rear fender 13 and by suitable rivets to the brackets 15. This pan "A" has upturned flanges 22 at the ends thereof and at its outer side edge has hinged portions 23 formed thereon or secured thereto. To these hinged portions are secured complementary hinge portions 24 which are designed to be secured to the running board 14 in any suitable manner, but preferably by line welding so that the securing of these hinged portions to the under side of the running board 14 will not appear from the upper surface thereof.

From the construction of the parts just described, it will be seen that we have hinged the outer longitudinal edge of the running board 14 so that it may be swung to the position indicated by the dotted lines 24ᵃ in Fig. 2 so that the pan "A" together with the running board 14 may form a carrier for a large number of articles, or the running board 14 may be swung on its hinges to horizontal position so that the flange 16 at the inner edge thereof will drop into the channel formed by the upturned edge of the mud guard 11, so that the appearance of the automobile will not be altered.

We also provide wings 25 at either end of the running board 14 which have one end, as at 26, shaped to correspond to the shape of the mud guards 11, and have their opposite ends hingedly secured at 27 to the running board 14 adjacent to the ends thereof so that when the wings 25 are moved to position perpendicular to the running board 14 and pan "A" then a box-like compartment will be formed between the mud guards 11 and wings 25 and the running board 14. It will be seen that this box-like compartment so formed may be covered by spreading a covering of any kind thereover to protect the contents thereof and that by the use of a piano type hinge illustrated at 23, 24 and 27 of the drawings, that a very tight joint will be secured between the various walls of the compartment so that anything from rice to trunks may be carried in the carrier without danger of being lost out unless there should be some things bounced over the walls of the compartment.

We provide a locking device illustrated in Figure 5 for locking the wings 25 in their open position. This consists of a sheet metal member "B" pivoted at 29 to the lower inner corner of the wings 25 in such a position that the hook member 30 of the member "B" may normally be forced into openings 31 and 32 in the hook over the edge of the pan "A". This hook-over portion may be reinforced by a wire 33 to prevent the hook 30 from pulling out. The hook 30 is rotated on its pivot 29 by a handle 34 and the parts are so arranged that the weight of the handle 34 will normally tend to hold the hook 30 into its retaining opening within the wings 25.

When it is desired to fold the carrier, the wings 25 are first swung on their hinges 27 in against the under side of the running board 14, the hook 30 having been properly released, and then the running board 14 is folded down to the full line position illustrated in Figure 2 which will dispose the wings 25 between the running board 14 and the pan "A". Means are provided also for preventing the wings 25 from rattling or becoming noisy when they are in their folded position consisting of the springs 35 which have one end riveted at 36 to the wings 25 adjacent to their inner ends as is illustrated in Figure 6. A slot 37 is formed in the wing 25 so that one end of the spring 35 may extend thru the slot 37 so that when the device is in folded position this extending end may contact with the running board 14, while another portion of the spring will contact with the pan "A" so that the riveted end of the spring will then yieldingly hold the free end of the wing 25 supported between the pan "A" and the running board 14, thereby preventing noise or rattle.

In the preferred form of our improved device device we employ an improved combined locking device and double hinge at the corners where the wings 25 adjoin the running board 14. This is accomplished by making one leg of the piano hinge 27, which is riveted or otherwise secured at 38, to the running board 14 with a shorter or offset portion 39 designed to form a housing for a slide bolt 40. This bolt 40 has an operating handle 41 extending thru a slot in the flange 16 of the running board 14 so that it may be conveniently operated and the shelter 39 is further offset at 42 to accommodate an offset portion 43 of the bolt 40 so that the inner end of the bolt 43 may extend into the opening 44 in the turned over edge of the pan "A" when the device is in folded position. It will thus be seen that the retracting of the bolt 41 will release the inner end 43 thereof thereby permitting the carrier to be moved to open or unbolted position where the hook (B) will lock it in a substantial manner. When the carrier, however, is folded the bolts 40 lock it in folded position so that the running board cannot rattle when so folded and bolted. The springs 35, of course, keep the wings from rattling when the running board is so locked.

In the form of device shown in Figure 8, we have disclosed a means for using our device as a substitute for the type of running boards composed of wooden parts which have rubber or linoleum coverings 46 with aluminum edgings 47. It will be understood in this connection that one of the most serious problems we have had to solve in the designing of this combined luggage carrier and running board is to provide a carrier so designed that it may be substituted for one of the running boards normally provided with an automobile without materially altering the appearance of the car, and in fact to provide such a device which might even be installed in place of both running boards on the ordinary car without altering the car's appearance.

This device illustrated in Figure 8 comprises an upper pan 48 having its edge turned downwardly in a manner similar to the running board 14 illustrated in the remaining figures. The inner edge, however, is again folded upon itself at 49 to form a combined brace and retaining wall for the edge of the linoleum covering 46. This linoleum or rubber, or other suitable coating may be secured to the face of the pan 48 in any suitable manner as by rivets or the like. The outer edge of the linoleum 46 is protected by a metallic binding strip 50 which, in the form here shown comprises an aluminum strip doubled upon itself with an inturned upper edge designed to over-lap the outer edge of the linoleum. The central folded portion of this fastening is turned around under the bottom edge of the outer flange of the pan 48 to thereby provide a tension and a holding means for holding this facing strip in place. Of course rivets may also be used if desirable or ornamental. The bottom pan "A" used in connection with this device and mountings therefor are similar in all respects to the pan "A" heretofore described and illustrated, the difference between this form and the other form being only that it provides a convenience in construction for a linoleum-covered running board for use in connection with our invention.

Many advantages resulting from the use of our improved device have already been brought out in the course of this specification, but it may be further mentioned that the construction here disclosed provides means for mounting a luggage carrier on an automobile running board, or rather combining a luggage carrier and running board in such a manner that the luggage carrier is practically imperceptible as such when in folded position. Moreover, there are no parts to present an unsightly appearance on an automobile, or to become damaged unduly from their exposure to the weather and wear to which a running board is normally subjected. Further, our improved running board is adapted to carry substantially any kind of a bundle or burden which is capable of being carried on the running board of an automobile. Some other changes may be made in the arrangement and construction of the various parts of our improved device without departing from the spirit of the invention therein, and it is our intention to cover by our claims such changes as may be reasonably included within the scope thereof.

We claim as our invention:

1. In a combined luggage carrier and running board for automobiles having a bottom pan and a combined retaining member and running board hingedly connected thereto and forming a concealment therefor, wings secured to the running board in position to both form a compartment therewith and to move to position inclosed between the running board and pan, and means for yieldingly holding said wings out of contact with both the running board and pan when the wings are in the last described position.

2. In a combined luggage carrier and running board for automobiles having a frame and a combined retaining member and running board hingedly connected thereto and forming a concealment therefor, wings secured to the running board in position to both form a compartment therewith and to move to position enclosed between the running board and frame, and means for yieldingly holding said wings from movement when the device is in closed position.

WALTER E. KELLY.
CLARENCE Z. HUBBELL.